April 11, 1961  L. A. ERREDE ET AL  2,979,539
DIFLUOROCARBENE FREE RADICALS IN THE SYNTHESIS
OF FLUORINATED OLEFINIC COMPOUNDS
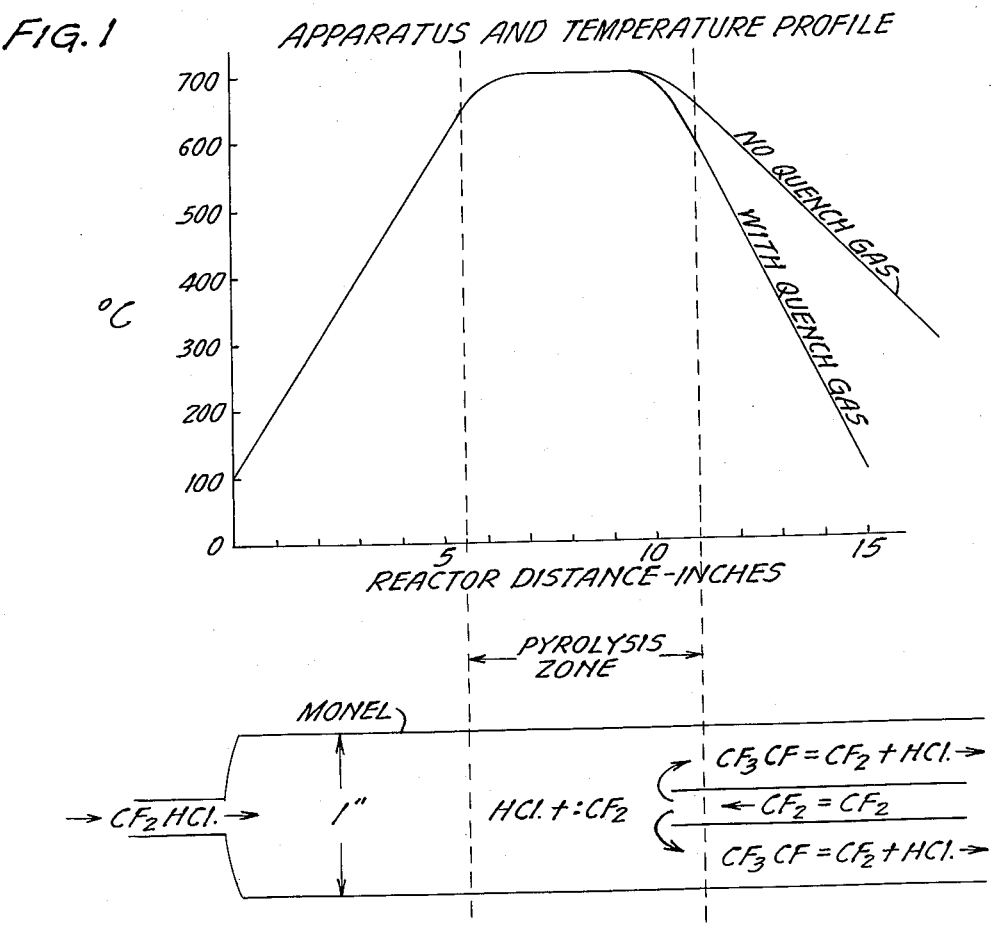
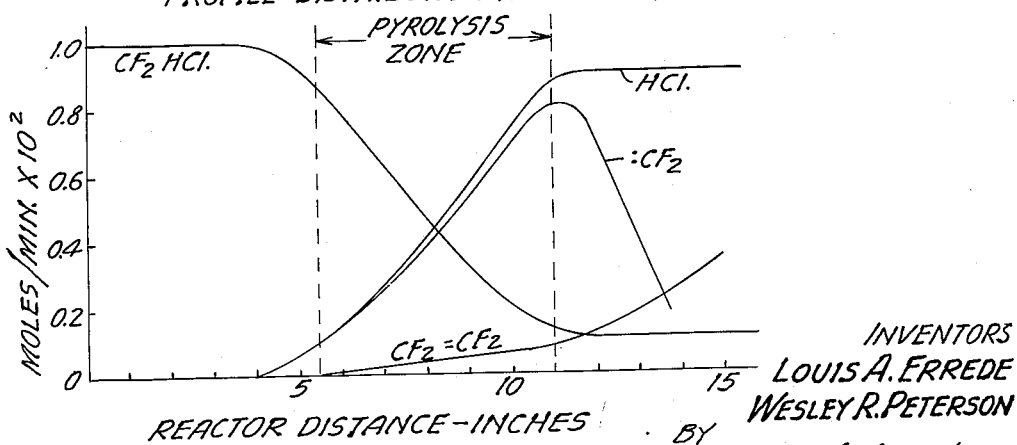
INVENTORS
LOUIS A. ERREDE
WESLEY R. PETERSON
BY
Carpenter, Abbott, Coulter & Kinney
ATTORNEYS

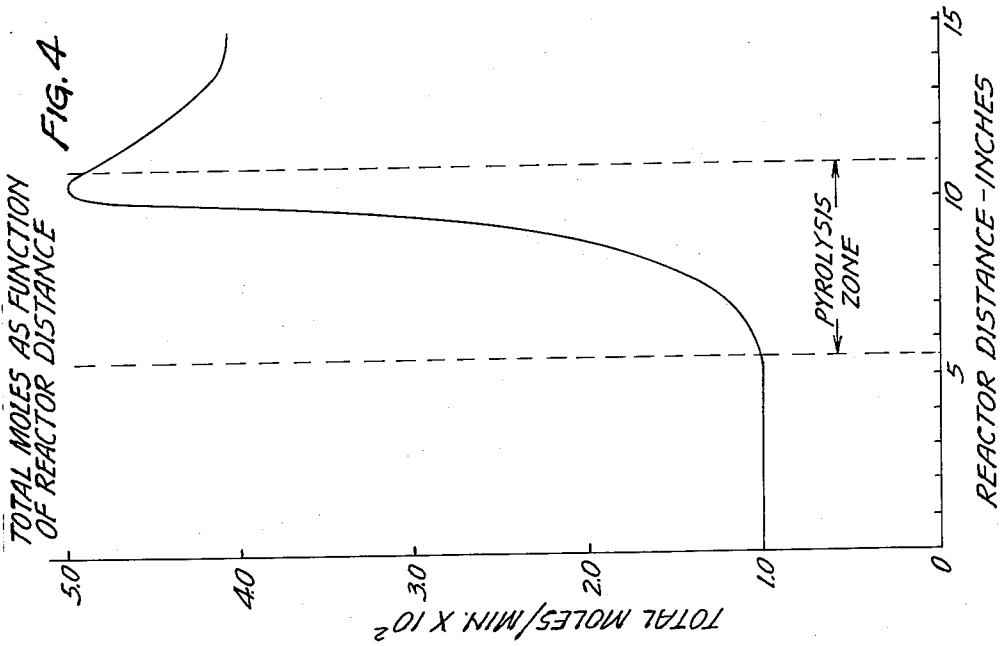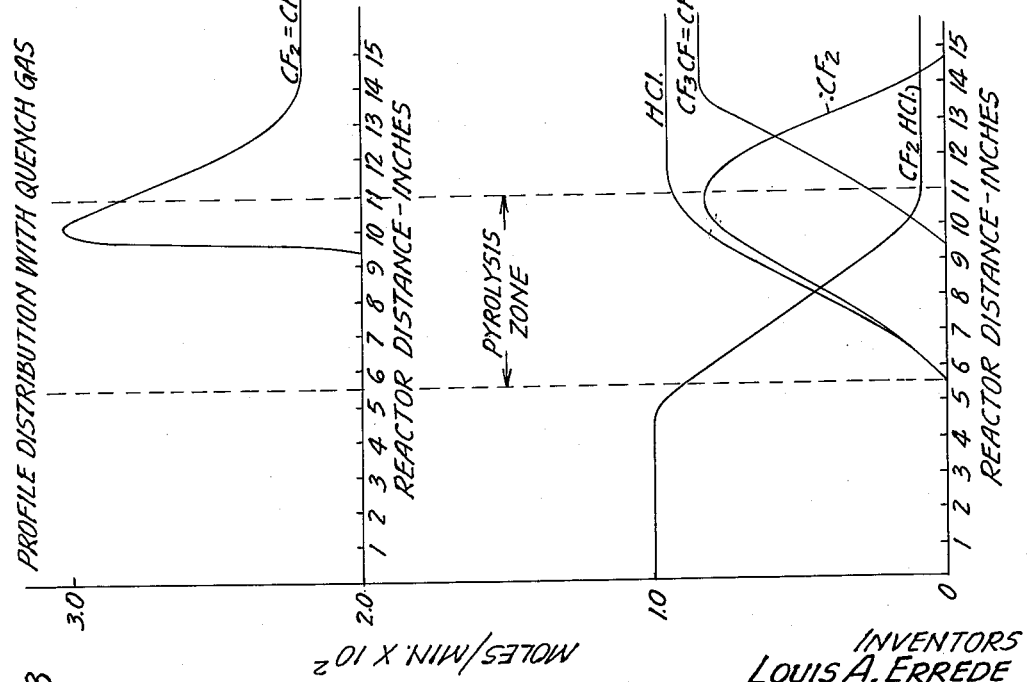

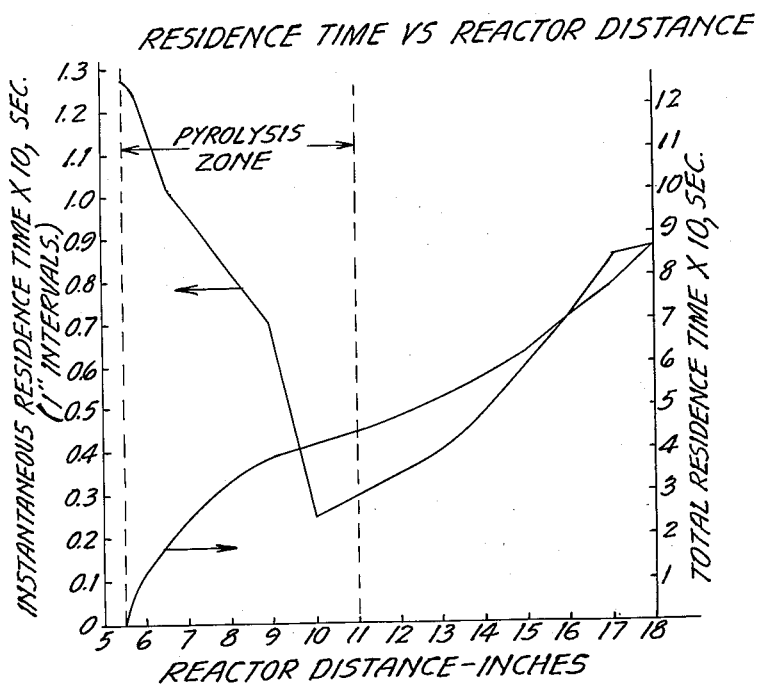
FIG. 5 RESIDENCE TIME VS REACTOR DISTANCE
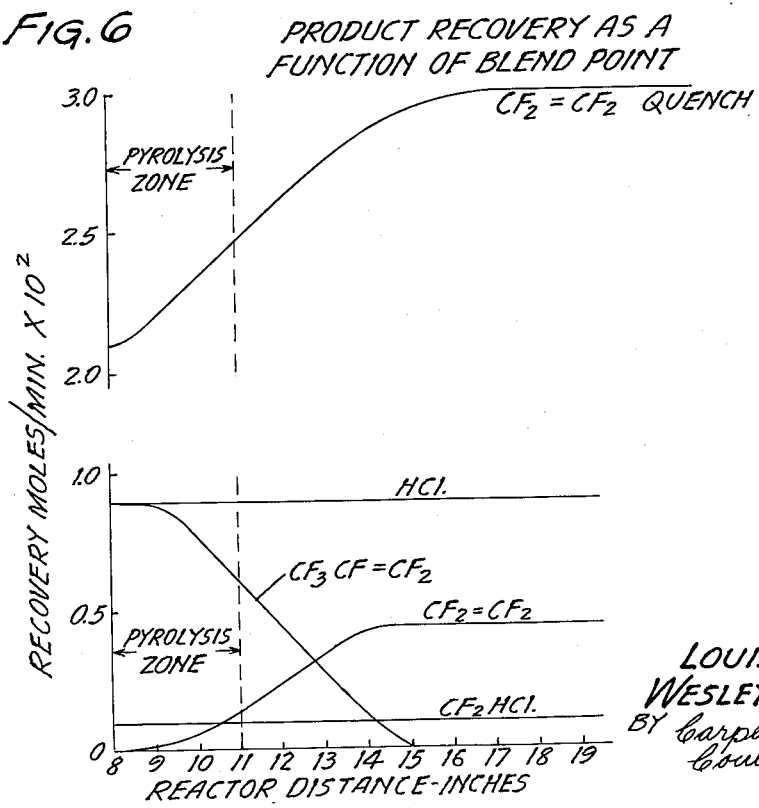
FIG. 6 PRODUCT RECOVERY AS A FUNCTION OF BLEND POINT
INVENTORS
LOUIS A. ERREDE
WESLEY R. PETERSON

United States Patent Office 2,979,539
Patented Apr. 11, 1961

2,979,539

DIFLUOROCARBENE FREE RADICALS IN THE SYNTHESIS OF FLUORINATED OLEFINIC COMPOUNDS

Louis A. Errede, St. Paul, and Wesley R. Peterson, North Oaks, Minn., assignors to Minnesota Mining and Manufacturing Company, St. Paul, Minn., a corporation of Delaware Filed Jan. 6, 1959, Ser. No. 785,246

7 Claims. (Cl. 260—653.3)

This invention relates to a process for the manufacture of unsaturated fluorine-containing compounds. In one aspect, this invention relates to the addition of a difluorocarbene radical to an ethylenically unsaturated compound to produce higher molecular weight fluorine-containing compounds.

Fluorinated ethylenically unsaturated compounds are highly valuable and useful intermediates and monomers in the manufacture of fluorinated polymers. Such polymers have found wide application where resistance to chemical and thermal attack are desired. Perfluoropropene, for example, has been copolymerized with tetrafluoroethylene to produce a high molecular weight interpolymer (U.S. 2,598,283). However, the methods generally employed for the preparation of fluorinated ethylenically unsaturated compounds with three or more carbon atoms have been costly and inefficient, particularly in high capacity production.

It is an object of this invention to provide a method for the production of fluorinated, ethylenically unsaturated compounds in high yield.

It is another object of this invention to provide an efficient process for the production of fluorinated ethylenically unsaturated organic compounds with a minimum production of less desirable by-products.

Still another object of this invention is to provide a novel and commercially attractive method for the production of fluorinated propenes, particularly perfluoropropene.

According to this invention, an ethylenically unsaturated compound is reacted with difluorocarbene radical to produce a fluorinated ethylenically unsaturated organic compound having at least three carbon atoms per molecule. This reaction involves the addition of the free radical $:CF_2$ to an ethylenically unsaturated compound and can be conducted either with or without the presence of a catalyst or a diluent. The reaction generally is believed to proceed as follows:

$$:CF_2 + CX_2 = CXR \rightarrow C_3F_2X_3R$$

wherein X is hydrogen, fluorine or chlorine, and R is hydrogen, fluorine, chlorine, or alkyl having no more than 2 C atoms, including halogenated alkyl. Preferably at least one, usually every, X is halogen and most preferably fluorine. R preferably comprises fluorine or chlorine.

The ethylenically unsaturated organic compound to which the difluorocarbene free radical is added is terminally unsaturated and contains from 2 to 4 carbon atoms. Included are compounds such as trifluorochloroethylene, tetrafluoroethylene, butene-1, vinylidene fluoride, vinyl fluoride, vinylidene chloride, vinyl chloride, 1,1-difluorodichloroethylene, propene, ethylene, 3,3,4,4,4-pentafluorobutene-1, perfluoropropene, and hexafluorobutene-1.

Generally the ethylenes are preferred, particularly the fluorinated ethylenes. The use of tetrafluoroethylene in this process, producing perfluoropropene, constitutes a particularly preferred embodiment. It may also be desirable to use other perhalogenated ethylenes, such as trifluorochloroethylene, as a reactant.

Any method can be employed to produce the difluorocarbene radical, providing the free radical is available for the addition reaction. Such methods include the production of difluorocarbene during the pyrolysis of $CHClF_2$, as described in U.S. 2,551,573. It is also possible to obtain the difluorocarbene free radical during the pyrolysis of tetrafluoroethylene at temperatures above 750° C. However, for the purposes of this invention, the method of producing difluorocarbene is not critical.

Because of the relatively short life of the difluorocarbene free radical, it is essential that it and the ethylenically unsaturated compound be brought into contact during the period in which the free radical exists, i.e., before the difluorocarbene radicals are consumed by self-condensation, and at a temperature at which the addition reaction can proceed, usually above about 100° C.

The reaction can be advantageously performed in a reaction tube similar to that appearing in Figure 1, although the process of this invention is not necessarily limited to a particular apparatus. Such tube is constructed of Monel, silver, alloy steel, or other material substantially inert to the reactants and reaction products and which will withstand the temperatures employed. Where the difluorocarbene radical is produced by the pyrolysis of $CF_2HCl$, the $CF_2HCl$ gas is introduced into one end of this tubular reactor and is heated therein to pyrolysis temperature as it flows through a pyrolysis zone. Heat may be applied by electric coils or other conventional heating means, and temperatures may be measured by thermocouples located on the tube wall or in the moving gas stream. A smaller tube inserted into the opposite end of the reactor tube and positioned coaxially therein introduces the ethylenically unsaturated organic compound into that section of the reaction zone in which difluorocarbene exists as a reactive free radical. The particular point of contact between the two reactants is determined experimentally and is related to the pyrolysis temperature, pressure, and residence time of the $CF_2HCl$ or difluorocarbene producing material. However, if the ethylenically unsaturated compound contacts the moving gas stream at a point upstream of the region in which difluorocarbene radical exists, it is subjected to pyrolysis temperatures which may, depending on such factors as residence time, etc., promote excessive pyrolysis of the ethylenically unsaturated compound, and thereby reduce the yield of the desired addition product. Conversely, if the ethylenically unsaturated compound is introduced into the moving gas stream at a point downstream of that region at which the difluorocarbene radical exists, the addition reaction cannot occur.

For purposes of more completely illustrating the practice of this invention, the process of producing perfluoropropene from $CF_2HCl$ and $CF_2=CF_2$ will be described with reference to the figures. It is to be understood that similar procedures can be employed with the other reactants described herein and with other operating conditions, within the scope of this disclosure.

Figure 1 shows the temperature profile of a 1" I.D. Monel reactor tube with the passage of one mole per minute flow of $CF_2HCl$. The pyrolysis zone is heated to a temperature of about 700° C., selected in conjunction with the pressure and $CF_2HCl$ residence time in the pyrolysis zone so as to optimize production of difluorocarbene radical. Generally, in the case of monochlorodifluoromethane, temperatures above about 600° C., and below about 1,000° C., may be used, the higher temperatures tending to increase pyrolysis and formation of difluorocarbene at a given residence time in the pyrolysis zone. Pressures may range between 0.01 and 10 atmospheres absolute, but are preferably below 0.5 atmospheres for increased formation of reactive free radicals. For the purposes of the present illustration, a pressure of 130 mm. Hg or 0.171 atmospheres has been employed. Further data on the effect of temperature and pressure on pyrolysis of $CF_2HCl$ is found in Industrial and Engineering Chemistry, vol. 39, No. 3, pp. 354–358.

Figure 2 is a plot showing the profile of the moles of the various reactants and products at various points along the reactor tube when no ethylenically unsaturated compound is introduced through the coaxially positioned tube. The difluorocarbene radical concentration rises to a maximum and then decreases as the radicals condense to form $CF_2=CF_2$. Measuring from the end of the reactor tube through which the $CF_2HCl$ is introduced at a flow rate of 1 mole per minute, the pyrolysis zone extends generally from 5½" to 11" and the optimum concentration of difluorocarbene free radical exists in the 9½" to 12" range. The blend point or point of introduction of the ethylenically unsaturated compound, hereinafter used interchangeably with tetrafluoroethylene, is coincident with this optimum and appears at 9½". In order to minimize the residence time of the ethylenically unsaturated monomer at the pyrolysis temperature, the operating conditions and physical dimensions of the pyrolysis zone are adjusted to place the point of optimum concentration of difluorocarbene radical at or near the downstream end of the pyrolysis zone.

When the rate of introduction of the tetrafluoroethylene is 3 moles per minute, a 3:1 ratio of ethylenically unsaturated reactant to $CF_2HCl$ is provided. Generally, an excess of the ethylenically unsaturated reactant, such as $CF_2=CF_2$, i.e., above 1:1 mole ratio and up to about 20:1, is desired so as to utilize more effectively the difluorocarbene produced and to increase the yield of addition product accordingly. The temperature of the ethylenically unsaturated reactant, e.g., $CF_2=CF_2$, can be varied over wide limits and should be sufficiently low to provide a quench effect (i.e., to lower the temperature of the mixed reactant stream below the pyrolysis temperature) and sufficiently high to maintain the temperature of the mixed reactant stream at a temperature at which addition will proceed, usually above about 100° C., over the zone containing free difluorocarbene radicals (9½" to 14" in Figure 3). It is particularly essential to select the temperature and pyrolysis zone residence time of the tetrafluoroethylene so as to prevent pyrolysis of the $CF_2=CF_2$. Figure 3 relates the mole concentration of the various components along the length of reactor tube, measured from the $CF_2HCl$ inlet end, with tetrafluoroethylene introduction at the 9½" point.

Figure 4 is a plot of the total mole concentration along the length of the reactor tube.

Figure 5 is a plot of total residence time and instantaneous residence time (average residence time in one inch intervals) as related to the distance from the $CF_2HCl$ inlet end.

Figure 6 is a plot of the molar concentration of the recovered products as related to the blend point or point of introduction of the tetrafluoroethylene. It will be noted that the 9½"–10" blend point region produces in this instance the optimum perfluoropropene with a minimum tetrafluoroethylene residence time in the pyrolysis zone. This corresponds to a conversion of about 90%, based on HCl produced, and to a yield of 85/95 or about 90% of perfluoropropene. The mixture leaving the reaction tube is washed with water, cooled to about −70° C., and fractionally distilled to recover the desired product.

Referring to the illustrative data appearing in the aforementioned figures, it is observed that the $CF_2HCl$ residence time in the pyrolysis zone is about 0.44 second and the $CF_2=CF_2$ residence time in the pyrolysis zone is about 0.05 second. Furthermore, pyrolysis of the latter does not become important because of the short residence time, usually below about 0.5 second.

As mentioned earlier, the process of this invention is not limited to the use of any one ethylenically unsaturated monomer. Thus, a variety of compounds of compounds can be produced by the reaction of difluorocarbene with ethylenically unsaturated olefin, including the following:

$:CF_2 + CF_2=CCl_2 \rightarrow CF_3—CF=CCl_2$ and isomers
$:CF_2 + CF_2=CFCl \rightarrow CF_3—CF=CFCl$ and isomers
$:CF_2 + CF_2=CH_2 \rightarrow CF_3—CF=CH_2$ and isomers
$:CF_2 + CH_2=CH_2 \rightarrow CF_2H—CH=CH_2$ and isomers
$:CF_2 + CH_2=CHCl \rightarrow CF_2H—CH=CHCl$ and isomers Using the system earlier described, a series of runs were made with chlorotrifluoroethylene as the ethylenically unsaturated reactant. The effluent gases from the pyrolysis of $CF_2HCl$ were blended with chlorotrifluoroethylene at distances from 2 to 4 inches downstream of the pyrolysis zone. The liquid products were distilled through a 30" vacuum jacketed column with the still head held below −30° C., and separated into two fractions: (1) B.P. below −20° C., and (2) B.P. above −20° C. Analysis of the product boiling above −20° C., indicated a substantial yield of $C_3$ or perfluorochlorinated propene. The results of this series of runs appear in Table I.

TABLE I

| Run | Temperature Pyrolysis Zone, °C | Temperature Blend Point, °C | Distance of Pyrolysis Zone From Blend Point, in. | Pressure, mm. Hg | Moles $CF_2HCl$ Feed | Mole Ratio, $\frac{CF_2HCl}{CF_2CFCl}$ | Moles :$CF_2$ Produced [b] | Moles $C_3F_5$:Cl produced [b] | Minimum Percent :$CF_2$ converted to $C_3F_5Cl$ [b] |
|---|---|---|---|---|---|---|---|---|---|
| 1 | 770 | 644 | 3.0 | 130 | 1.10 | 1/1 | 0.53 | 0.04 | 8 |
| 2 | 750 | 500 | 4.5 | 130 | 1.69 | 1/3 | 0.69 | 0.05 | 7 |
| 3 | 740 | 660 | 4.0 | 123 | 1.97 | 1/3 | 0.73 | 0.14 | 19 |
| 4 | 728 | 716 | 2.5 | 125 | 1.39 | 1/3 | 0.51 | 0.17 | 33 |
| 5 | 722 | 710 | 2.0 | 130 | 1.69 | 1/3 | 0.79 | 0.17 | 22 |
| 6 | 772 | 738 | 2.0 | 130 | 0 | [a] 1/3 | 0 | (c) | |

[a] Ratio of $N_2/CF_2=CFCl$ (2 moles $CF_2=CFCl$ feed).
[b] Minimum value, includes only $C_3F_5Cl$ in richest distilled fraction of product.
[c] 5 grams of pyrolysis product (cyclobutanes, etc.).

Using the physical system described earlier (see Figure 1), the following Table II illustrates particular exemplary operating conditions for still other fluorinated ethylenically unsaturated reactants.

TABLE II

| Ethylenically Unsaturated Reactant | Moles/min. CF$_2$HCl | Pyrolysis | | | Moles/min. ethylenically unsaturated reactant | Blend T, °C. | Overall Percent Conversion of :CF$_2$ to addition product |
|---|---|---|---|---|---|---|---|
| | | T, °C. | t, sec. | P, atm. | | | |
| CH$_2$=CF$_2$ | 0.035 | 700 | 1.0 | 0.1 | 0.20 | 200 | 85 |
| CF$_2$=CCl$_2$ | 0.03 | 700 | 0.8 | 0.3 | 0.20 | 150 | 80 |
| CF$_3$CF$_2$CH=CH$_2$ | 0.02 | 700 | 0.5 | 0.4 | 0.15 | 150 | 74 |

Generally, the process of this invention involves the reaction of difluorocarbene free radical with an ethylenically unsaturated compound, preferably an ethylene compound. Because of the abbreviated life of such free radicals, it is an essential element of this process to bring the difluorocarbene free radical into contact with the ethylenically unsaturated compound during the brief life-span of the former, thereby to promote an addition reaction between the two and the formation of an ethylenically unsaturated compound having one more carbon atom than the original unsaturated reactant. For maximum yield, the residence time the ethylenically unsaturated reactant at pyrolysis temperatures is kept at a minimum and the temperatures of the reactants during the addition reaction (until the concentration of free radical approaches zero) is maintained above about 100° C., and under conditions at which substantially no pyrolysis of the unsaturated reactant occurs. Objectionable pyrolysis of the ethylenically unsaturated reactant can readily be ascertained under any given set of operating conditions by carrying out runs in the absence of the difluorocarbene radical and analyzing the resultant product. Only those conditions under which substantially no pyrolysis of the ethylenically unsaturated reactant occurs, i.e., less than about 5 percent pyrolysis of said reactant occurs, i.e., less than about 5 percent pyrolysis of said reactant, should be used, to avoid formation of saturated by-products and reduced yield of the desired addition product.

Since many widely different embodiments of this invention may be made without departing from the spirit and scope thereof, it is to be understood that the specific embodiments herein are recited only for purposes of illustration and are not to be construed as limiting.

We claim:
1. A process which comprises producing difluorocarbene free radical and reacting said difluorocarbene free radical with an ethylenically unsaturated compound having from 2 to 4 carbon atoms at a temperature above about 100° C., and under conditions at which substantially no pyrolysis of the ethylenically unsaturated compound occurs.
2. A process which comprises producing difluorocarbene free radicals and reacting said difluorocarbene free radical with a fluorinated ethylene having only fluorine, chlorine and hydrogen substituents at a temperature above about 100° C., and under conditions at which substantially no pyrolysis of the fluorinated ethylene occurs.
3. The process of claim 2 in which the fluorinated ethylene is tetrafluoroethylene.
4. The process of claim 2 in which the fluorinated ethylene is chlorotrifluoroethylene.
5. The process of claim 2 in which the fluorinated ethylene is vinylidene fluoride.
6. The process of claim 2 in which the fluorinated ethylene is dichlorodifluoroethylene.
7. The process of claim 2 in which the temperature is at least 500° C.

References Cited in the file of this patent
UNITED STATES PATENTS
2,758,138   Nelson _____ Aug. 7, 1956